United States Patent
Sin Xicola et al.

(10) Patent No.: US 7,780,936 B2
(45) Date of Patent: Aug. 24, 2010

(54) PROCESS FOR MANUFACTURING AN ELECTROCHEMICAL DEVICE

(75) Inventors: Agustin Sin Xicola, Milan (IT); A. Yuri Dubitsky, Milan (IT); Enrico Albizzati, Milan (IT); Evgeny Kopnin, Milan (IT); Elena Roda, Milan (IT)

(73) Assignee: Pirelli & C. S.p.A., Milan (IT)

( * ) Notice: Subject to any disclaimer, the term of this patent is extended or adjusted under 35 U.S.C. 154(b) by 289 days.

(21) Appl. No.: 10/593,481

(22) PCT Filed: Mar. 30, 2004

(86) PCT No.: PCT/EP2004/003618

§ 371 (c)(1), (2), (4) Date: Apr. 22, 2008

(87) PCT Pub. No.: WO2005/095270

PCT Pub. Date: Oct. 13, 2005

(65) Prior Publication Data

US 2008/0233030 A1    Sep. 25, 2008

(51) Int. Cl.
*C01F 15/00* (2006.01)

(52) U.S. Cl. .................... 423/252; 423/592.1; 423/263; 423/594.18; 423/618

(58) Field of Classification Search .................. 429/12; 423/252, 592.1, 263, 636, 607, 608, 625, 423/541, 617, 279, 594.18, 594.19, 604, 423/624, 632, 605, 606, 594.17, 618, 260
See application file for complete search history.

(56) References Cited

U.S. PATENT DOCUMENTS

| | | |
|---|---|---|
| 5,698,483 A | 12/1997 | Ong et al. |
| 5,788,950 A | 8/1998 | Imamura et al. |
| 2004/0038133 A1* | 2/2004 | Yamaguchi et al. ......... 429/326 |

FOREIGN PATENT DOCUMENTS

| | | |
|---|---|---|
| EP | 0 255 702 A2 | 2/1988 |
| EP | 0 685 435 A2 | 12/1995 |
| FR | 2 628 664 A | 9/1989 |

OTHER PUBLICATIONS

Tarancón, et al., "Synthesis of nanocrystalline materials for SOFC applications by acrylamide polymerisation", Journal of Power Sources, vol. 118, No. 1-2, pp. 256-264, (May 25, 2003).

(Continued)

*Primary Examiner*—Timothy C Vanoy
*Assistant Examiner*—Richard M Rump
(74) *Attorney, Agent, or Firm*—Finnegan, Henderson, Farabow, Garrett & Dunner, L.L.P.

(57) ABSTRACT

Process for manufacturing an electrochemical device including a cathode, an anode and at least one electrolyte membrane disposed between the anode and the cathode, wherein at least one of the cathode, the anode and the electrolyte membrane, contains at least a ceramic material.

31 Claims, 3 Drawing Sheets

OTHER PUBLICATIONS

Figure 1:
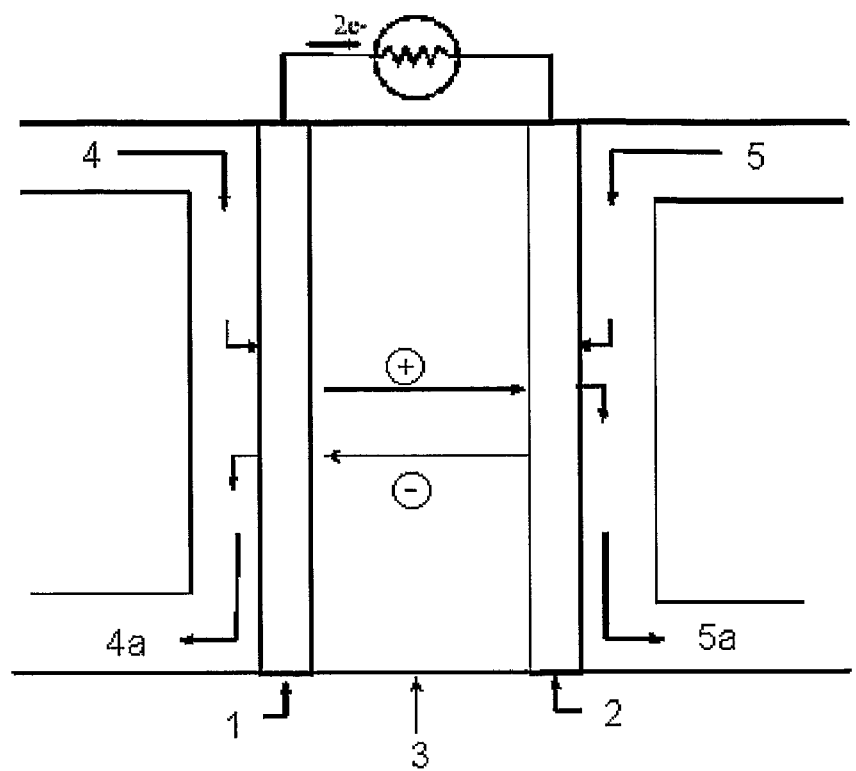

Sin et al.; "Gelation by Acrylamide, a Quasi-Universal Medium for the Synthesis of Fine Oxide Powders for Electroceramic Applications", Advanced Materials, vol. 12, No. 9, pp. 649-652, (2000).

Steele et al., "Materials for fuel-cell technologies", Insight Review Articles, Nature, vol. 414, pp. 345-352, (2001).

West; "Solid State Chemistry and its Applcations", John Wiley & Sons, pp. v, 114-115 and 174-175, (1996).

Wang et al., "Performance of a $La_{0.6}Sr_{0.4}Co_{0.8}Fe_{0.2}O_3$-$Ce_{0.8}Gd_{0.2}O_{1.9}$-Ag cathode for ceria electrolyte SOFCs", Solid State Ionics vol. 146, pp. 203-210, (2002).

\* cited by examiner

US 7,780,936 B2

PROCESS FOR MANUFACTURING AN ELECTROCHEMICAL DEVICE

CROSS REFERENCE TO RELATED APPLICATION

This application is a national phase application based on PCT/EP2004/003618, filed Mar. 30, 2004, the content of which is incorporated herein by reference.

BACKGROUND OF THE INVENTION

The present invention relates to a process for manufacturing an electrochemical device comprising at least one component based on a ceramic or ceramic containing material, for example cermets (ceramic and metallic composites), and for preparing nanosize powders for producing said at least one component.

The active basic structure of an electrochemical device such as a solid oxide fuel cell (SOFC) or an oxygen generator consists of an electrolyte layer (electrolyte membrane) interposed between an anode and a cathode. Typically, electrolyte membrane, cathode and anode contain ceramics and/or cermets.

In the present specification and claims, ceramic and cermet materials are collectively referred to as "ceramics" or "ceramic materials".

PRIOR ART

The effectiveness of ceramics in electrochemical devices depends upon the characteristics of the powders used as starting materials which are used to produce bulk ceramic products. In general, to achieve desirable characteristics in the finished products, a ceramic powder should consist of particles with a narrow size distribution in the submicron range. In addition, to avoid pores larger than the mean primary grain size, the particles should be finally subdivided, rather than aggregated in agglomerated clusters. Agglomerated clusters often produce low-density green ceramics and leave numerous large pores after sintering. Finally, it is important that the ceramic powder is substantially free of contaminants to insure purity of the resulting high technology ceramic.

Nanosize powders are expensive and difficult to prepare in large quantities. As reported by A. Sin and P. Odier, Advanced Materials Vol. 12, No. 9 (2000) 649-652, a method commonly applied for obtaining fine powders is the so-called solid-state reaction or "ceramic way". It involves intimate mechanical mixing of oxides, carbonates or nitrates, repeated grinding and heating cycles to achieve complete reaction between all reagents. However, besides its simplicity, this technique has clear disadvantages because it provides large grain size (1-10 µm) and requires multiple repetitions of prolonged thermal treatment and grinding. As a consequence, uncontrolled crystalline growth might occur which causes chemical and dimensional non-uniformity.

Synthesis using wet chemistry, often called "chemical route", can overcome many of these disadvantages. The homogeneity of the product is expected to increase because mixing of the reagents occurs at a molecular level, in solution. The resulting powders have a high specific surface area and, consequently, have a high reactivity that decreases the final temperature treatment and time of synthesis. Different chemical routes exist to form fine ceramic powders such as co-precipitation, spray drying, freeze drying, sol-gel. Unfortunately these methods are time consuming if large quantity of fine powders are to be obtained. Moreover, obtaining a high homogeneity for complex compositions (involving different metal cations) might become very difficult owing to the generally different chemical behavior of each cation.

FR 2 628 664 (in the name of Rhône-Poulenc Chimie) illustrates the preparation of ultrafine and homogeneous powders of simple or mixed mineral oxide by preparing a stable cation solution (Sol), where an organic macromolecular matrix (gel) is formed. Said matrix is prepared by polymerizing and/or copolymerizing, e.g. by polycondensing one or more organic monomer previously added to said solution or sol. Acrylamide or methacrylamide are used as monomers, N,N'-methylenediacrylamide as cross-linker, in the presence of tetramethylene-ethylenediamine (TEMED) as polymerization accelerator, and ammonium persulfate as polymerization initiator. The resulting powders have an average mean primary grain size comprised between 0.1 and 0.5 µm.

A. Sin and P. Odier, supra, relate to the use of acrylamide gel for obtaining a 3D organic matrix in a cationic solution, especially for preparing oxide nanopowders. However, the presence of chemical elements such as transition elements (Cu, Ni, Mn), rare-earth elements (La, Y) and metalloid elements of the p-group (Bi) impedes the gel formation because they react with acrylamide monomers to form complexes. For this reason, formation of gels containing, e.g. copper and yttrium, is possible only when a low concentration of cations is used. In order to avoid this side-reaction, a chelating agent, e.g. EDTA, is commonly used to sequester the cation from the monomers. Nevertheless, different side-reactions may affect the formation of the chelate, depending on the nature of the cation used. In these cases, it is appropriate to chelate each cation separately, in its most stable range of pH.

The drawbacks discussed by the above document are of particular importance in manufacturing nanosize crystallite powder for electrochemical devices such as solid oxide fuel cells wherein transition elements and rare-earth elements like lanthanum and yttrium are widely used. For example, in the case of SOFC, electrolyte membrane can be yttria-doped zirconia (YSZ), La(Sr)MnO3 (LSM) can be used as cathode material, and a cermet comprising Ni can be provided as anode material (B. C. H. Steele and A. Heinzel, Nature, vol. 414, 2001, 345-352).

U.S. Pat. No. 5,698,483 (in the name of Institute of Gas Technology) relates to a process for producing nanosize powders comprising the steps of mixing an aqueous continuous phase comprising at least one metal cation salt with a hydrophilic organic polymeric disperse phase, forming a metal cation salt/polymer gel, and heat treating the gel at a temperature sufficient to drive off water and organics within the gel, leaving as a residue a nanometer particle-size powder. By the term "gel" it is meant a colloid in which a disperse phase is combined with a continuous phase to produce a viscous gel-like product. Among the hydrophilic organic materials, 2-hydroxyethylenemethacrylate, hydroxyalkylmethacrylate, hydroxyalkylacrylate and acrylamide are listed. Examples are provided which employ polyethyleneglycol, methylcellulose or polyurethane in solution with a metal cation at concentration lower than 0.4 mol/l in water.

SUMMARY OF THE INVENTION

The Applicant has perceived that a key-point for manufacturing electrochemical devices with reliable and efficient performance lies in providing cathode, anode and/or electrolyte membrane based on ceramics prepared from nanosize powders. A process for producing nanosize powders is desirable, which should allow large scale production of substantially pure, homogeneous powders in high yields.

The Applicant has found that by a process comprising in situ formation of a gel from a hydrosoluble ethylenically unsaturated ester monomer and a cross-linker eliminates the problem of metal cation interaction, and allows the large scale obtainment of nanosize chemically complex products in a single batch and without the necessity of employing chelating agents.

Therefore, the present invention relates to a process for manufacturing an electrochemical device including a cathode, an anode and at least one electrolyte membrane disposed between said anode and said cathode, wherein at least one of the cathode, the anode and the electrolyte membrane, each containing at least a ceramic material, is produced by performing at least the following steps of:

thermally treating an aqueous solution comprising at least one metal cation, at least one hydrosoluble ethylenically unsaturated monomer with an ester moiety, and a hydrosoluble cross-linking monomer with at least two ethylenically unsaturated ester moieties, to provide a gel and to obtain said at least one metal cation in an oxide form;

calcining said gel to remove organic substances and to form a crystal phase of said at least one metal oxide in a nanosize powder form;

sintering said powder to provide the ceramic material.

Examples of electrochemical devices which can be manufactured according to the process of the present invention are solid oxide fuel cells (SOFCs), molten carbonate fuel cells (MCFCs), gas separators and gas sensors.

Examples of ceramic materials useful for the anode of the electrochemical device manufactured according to the inventions are ceramic composite materials (cermet) wherein the metallic portion can be selected from copper, aluminum, gold, praseodymium, ytterbium, cerium, nickel, iron, cobalt, molybdenum, platinum, iridium, ruthenium, rhodium, silver, palladium, and the ceramic portion can be selected from yttria-stabilized zirconia (YSZ), ceria doped with gadolinia (CGO) or samaria (SDC), and $La_{1-x}Sr_xGa_{1-y}Mg_yO_{3-\delta}$ wherein x and y range from 0 to 0.7, extremes included, and $\delta$ is from stoichiometry; or ceramics such as cerium oxide (ceria), manganese oxide, molybdenum oxide, titania, SDC, CGO, niobia-doped ceria, and perovskite-like composites such as $La_{0.75}Sr_{0.25}Cr_{0.5}Mn_{0.5}O_3$ (LSCM) and $La_{0.8}Sr_{0.2}Fe_{0.8}Co_{0.2}O_{3-\delta}$ (LSCFO).

Examples of ceramic materials useful for the electrolyte membrane of the electrochemical device manufactured according to the inventions are YSZ, CGO, SDC and $La_{1-x}Sr_xGa_{1-y}Mg_yO_{3-\delta}$ wherein x and y are as above.

Examples of ceramic materials useful for the cathode of the electrochemical device manufactured according to the inventions are oxides of rare earth elements, such as praseodymium oxide, perovskites as those above, optionally in combination with a doped ceria, and mixtures thereof.

As aqueous solution is intended a solution wherein as solvent water or a mixture of water and at least one hydrosoluble solvent is used. As hydrosoluble solvent an alcohol, glycol, tetrahydrofuran, dioxane may be used.

Examples of metal cations suitable for the process of this invention comprise lanthanum, strontium, chromium, zirconium, yttrium, aluminium, lithium, antimony, boron, cadmium, cerium, cobalt, copper, dysprosium, erbium, europium, gallium, gold, hafnium, holmium, iridium, iron, lutetium, manganese, molybdenum, nickel, niobium, osmium, palladium, platinum, praseodymium, rhenium, rhodium, rubidium, ruthenium, samarium, scandium, silver, sodium, tantalum, terbium, thorium, thulium, tin, titanium, tungsten, uranium, vanadium, ytterbium.

The at least one metal cation solution can be obtained by dissolving a hydrosoluble precursor thereof. Examples of precursors are oxides, chlorides, carbonates, β-diketonates, hydroxides, nitrates, acetates, oxalates, and mixtures thereof. Additional considerations for selecting the cation precursor may include low temperature decomposition and environmentally safe composition of the cation precursors.

Advantageously, the concentration of the at least one metal cation in the aqueous solution is higher than 0.5 mol/l, preferably from 1 to 10 mol/l. It should be noted that the process of the invention allows to use such high concentration of metal cation, thus providing high yield of product.

It should be also noted, that the process of the invention allows to obtain stable metal cation solution in the substantial absence of any chelating agent.

Preferably, hydrosoluble ethylenically unsaturated monomers with an ester moiety used in the process of the present

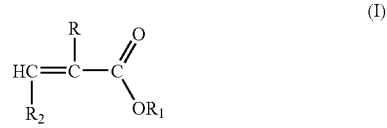

(I)

invention are encompassed by the general formula (I)

wherein R is hydrogen, $(C_1-C_4)$alkyl, aryl or aryl(C1-C4)alkyl; $R_1$ is a $C_1$-$C_8$ hydrocarbon group containing at least one polar group selected from —COOH, —NH$_2$, —NHR', —N(R')$_2$, —OH, —OR'—SO$_3$H, —SH, wherein R' is a $(C_1$-$C_6)$alkyl group; and $R_2$ is hydrogen, methyl, ethyl, propyl or phenyl.

Preferably R' is a $(C_1-C_4)$alkyl group.

Examples of monomers of formula (I) are (meth)acrylate monomers such as 2-hydroxyethyl acrylate, 2-hydroxypropyl acrylate, 2-hydroxyethyl methacrylate, 2-hydroxypropyl methacrylate, 2-hydroxyethyl phenacrylate, hydroxybutyl acrylate, hydroxybutyl methacrylate, butandiol monoacrylate, 2-(2-ethoxyethoxy)ethyl acrylate, dimethylamino ethyl acrylate, and dimethylamino ethyl methacrylate.

Cross-linking monomers useful in the present process are preferably selected from diacrylates and triacrylates wherein the acrylates groups are linked to alkoxylated moieties or polyoxyalkylene linear units. Examples are polyethyleneglycol diacrylate, ethoxylated trimethlolpropanetriacrylate.

Advantageously, said aqueous solution comprises a hydrosoluble polymerization initiator, such as α,α'-azoisobutyronitrile (AIBN), tetramethylene-ethylenediamine, peroxides, e.g. hydrogen peroxide, benzoyl peroxide or dicumyl peroxide, persalts, e.g. ammonium, sodium or potassium persulfate.

Preferably, the aqueous solution is thermally treated at a temperature ranging between about 50° C. and about 150° C.

By the term "gel" as used throughout the specification and claims, it is intended a jellylike, non-flowable structure based on a polymeric network entrapping a liquid phase comprising solvent, reactants and not cross-linked polymer chains.

Before proceeding to the calcining step, the gel obtained by the process of the invention is optionally dried to obtain a xerogel.

Said xerogel is a substantially dry, hard gel resulting from the removal of the aqueous phase from the gel, which usually causes a shrinkage of the gel network.

This optional drying step is preferably carried out by heating at a temperature ranging between about 80° C. and about 300° C.

Advantageously, the xerogel is disaggregated by known techniques, e.g. grinding or ball-milling, and subjected to the calcining step.

The calcining step is preferably carried out at a temperature ranging between about 300° C. and about 1500° C. This treatment results in the removal of residual impurities such as solvent and organic substances, and the crystallization of the oxide or mixed oxide phase in form of a nanosize powder.

In an embodiment of the invention, the calcining step is carried out by progressively increasing temperature. This is preferable when the temperature for eliminating the impurities is different, and it is typically lower, than the crystallization temperature. Advantageously, at least one grinding step of the powder is carried out at an intermediate stage of the calcining step.

As "nanosize powder" it is intended a powder having a mean primary grain size lower than 1,000 nm, preferably lower than 100 nm. Advantageously, the nanosize powders obtained by the process of the present invention show a mean primary grain size lower than 20 nm, for example comprised between about 3 nm and 15 nm.

By the term "primary grain size" as used throughout the specification and claims, it is intended the size of the primary particles which are distinguishable units in a transmission electron micrograph (TEM).

Advantageously, before the sintering step the nanosize powder is compacted in pellets or shaped in form of anode, cathode or electrolyte membrane for electrochemical devices.

The sintering step is carried out at temperatures depending on the nature of the components of the desired ceramic.

When a cermet is desired, a nanosize powder comprising all of the constituents of the final product is advantageously prepared. Alternatively, a nanosize powder of oxide precursor/s of the metallic portion is prepared separately from the nanosize powder of oxide/s of the ceramic portion. In both of the cases, a reduction step is effected, advantageously together with the sintering step in the latter case, for example under hydrogen atmosphere.

Advantageously the sintering temperatures are lower than those for powders prepared in accordance with the teachings of the prior art. For example, $La_{0.60}Sr_{0.40}Fe_{0.80}Co_{0.20}O_{3-\delta}$, was obtained by sintering at 700° C., 500 lower than the sintering temperature reported by the prior art (S. Wang, T. Kato, S. Nagata, T. Honda, T. Kaneko, N. Iwashita, M. Dokiya, Solid State Ionics, 146 (2002), 203-210).

Advantageously, the ceramic or cermets material are obtained by the process of the present invention already in the shape suitable for an anode, a cathode or an electrolyte membrane of an electrochemical device.

Another object of the present invention relates to a process for manufacturing a nanosize oxide powder, the process comprising the steps of:

thermally treating an aqueous solution comprising at least one metal cation, at least one hydrosoluble ethylenically unsaturated monomer with an ester moiety, and a hydrosoluble cross-linking monomer with at least two ethylenically unsaturated ester moieties, to provide a gel and to obtain said at least one metal cation in an oxide form;

calcining said gel to remove organic substances and to form to form a crystal phase of said at least one metal oxide in nanosize powder form.

DETAILED DESCRIPTION OF PREFERRED EMBODIMENTS

The invention will be further illustrated hereinafter with reference to the following examples and figures, wherein:

FIG. 1 schematically represents an example of electrochemical device;

FIGS. 2-6 show X-ray diffraction (XRD) patterns of powders obtained with the process of the invention.

FIG. 1 schematically illustrates a fuel cell comprising anode (1), cathode (2) and electrolyte membrane (3) with the reactant/product gases and the ion conduction flow directions through the cell. Gaseous fuels (4), e.g. hydrogen, hydrocarbons, alkali carbonates are fed to the anode (1) (negative electrode) and an oxidant (5) (i.e., oxygen from air) is fed to the cathode (2) (positive electrode); the electrochemical reactions take place at the electrodes to produce an electric current. Depleted fuel (4a) and depleted oxidant (5a) are eliminated optionally with by-products of their reactions.

The architecture of an oxygen separator is substantially analogous (anode, cathode and electrolyte membrane). Similarly to a fuel cell, air or an oxygen containing gas (5) is provided to the cathode (2). By an electrical potential applied across an oxygen ion conductive electrolyte membrane (3) via electrodes, oxygen is dissociated and reduced at the cathode (2). Oxygen ions travel through the electrolyte membrane (3), and are oxidized and recombined at the anode (1) to produce oxygen.

Example 1

Cerium/Gadolinium Oxides Nanopowder and $Ce_{0.8}Gd_{0.2}O_{1.9}$ 1.8716 g of $Ce(NO_3)_3.6H_2O$ and 0.4279 g of $Gd(NO_3)_3.6H_2O$ were added to 10 ml $H_2O$ while stirring and heating up to 50° C. to provide a solution with a metal cation concentration of 0.538 mol/l. 10 ml of 2-hydroxyethylmethacrylate and 5 ml polyethyleneglicoldiacrylate were added. The solution was heated up to 100° C. 20 drops of 35 vol % $H_2O_2$ were added to initiate the gel formation.

The resulting gel was decomposed at 500° C. for 5 h. 1 g of the title compound was obtained and characterized as follows.

Figure 2:
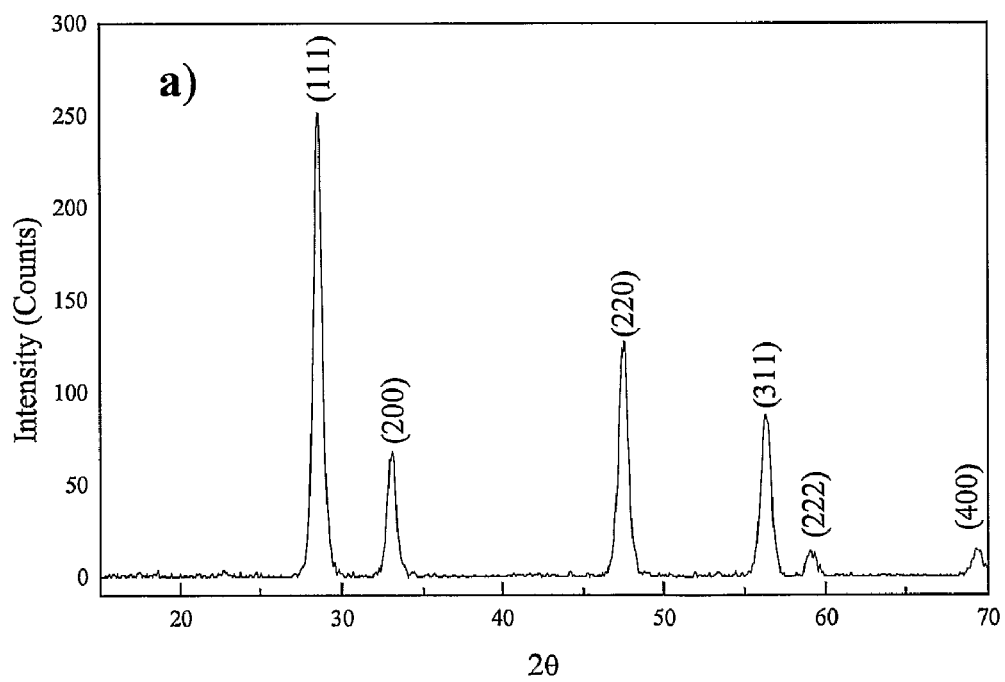

The XRD pattern of FIG. 2 shows that the sample is monophasic and $Ce_{0.8}Gd_{0.2}O_{1.9}$ powder has a mean primary grain size of 10 nm calculated using the Debye-Scherrer formula (A. R. West, "Solid State Chemistry and its application" Ed. John Wiley & Sons, 1996, page 174).

The nanopowder was compacted in pellet under an uniaxial pressure of 200 MPa and sintered at a temperature of 800° C. for 5 hours, then at 1450° C. for 3 hours.

Density measurement using the method of Archimede (PSS model, Gibertini, Italy) showed a relative density >95% of the crystallographic one.

Example 2

Copper/Nickel Oxides Nanopowder and $Cu_{0.47}Ni_{0.53}$ Alloy (1:1 by Weight)

1 g of Cu was added with 5 ml $H_2O$ while stirring and heating up to boiling. $HNO_3$ (3 ml; 65 vol %) was dropwise added, followed by 1 g of Ni. Further $HNO_3$ (3.5 ml; 65 vol %) was added followed by $H_2O$ up to a total volume of 10 ml. The resulting solution had a metal cation concentration of 3.277 mol/l. The solution was added with 10 ml of 2-hydroxyethylmethacrylate, 5 ml of polyethyleneglycol diacrylate and 50 mg of AIBN, then heated (80° C.) to yield a gel.

The gel was dried at 200° C. for 2 h. The resulting xerogel was ground, crashed and decomposed at 500° C. for 2 h to give a mixture of CuO, NiO and $Cu_{0.47}Ni_{0.53}O$ which was characterized as follows.

Figure 3:
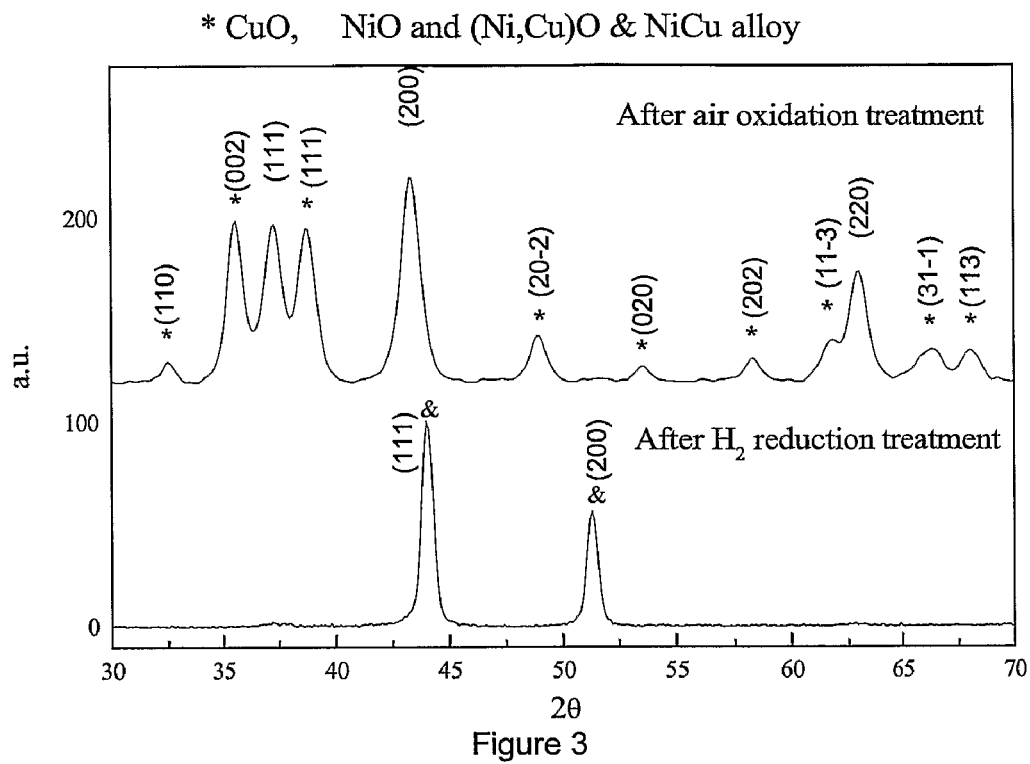

FIG. 3 shows the XRD patterns of said mixture. The mean primary grain size was calculated from the XRD patterns by use of the Debye-Scherrer formula (A. R. West "Solid State Chemistry and its application" Ed. John Wiley & Sons, 1996, page 174) giving a values of 10 nm for NiO (together with the isostructural phase (Ni,Cu)O) and 8 nm for CuO. The TEM imaging was in agreement with the calculated mean primary grain size. SEM images showed that powders were weakly agglomerated each other.

The oxide mixture was reduced at 500° C. for 2 hours in $H_2$ (100%) to give 2.5 g of the title alloy. The XRD pattern of FIG. 3 indicates that the Ni—Cu alloy pure phase has a mean primary grain size of 16 nm.

Example 3

Copper/Nickel/Cerium/Gadolinium Oxides Nanopowder and $Cu_{0.47}Ni_{0.53}$ and $Ce_{0.8}Gd_{0.2}O_{1.9}$ Cermet 1.164 g of Cu was added with 5 ml of $H_2O$ while stirring and heating up to boiling. $HNO_3$ (3.5 ml; 63%) was dropwise added. 1.212 g of Ni was then added followed by $HNO_3$ (63%) up to a total acid volume of 4.3 ml.

The resulting mixture was added with 5.992 g. of Ce $(NO_3)_3 \times 6H_2O$, 1.370 g of $Gd(NO_3)_3 \times 6H_2O$ and water up to a total volume of 15 ml to provide a solution with a metal cation concentration of 3.747 mol/l.

The resulting mixture was added with 15 ml of 2-hydroxyethylmethacrylate, 7.5 ml of polyethyleneglycol diacrylate and 100 mg of AIBN, and heated (80° C.) up to the gel formation.

The gel was dried at 200° C. for 2 h to yield a xerogel which was ground, crashed and decomposed at 500° C. for 1 h. A powder mixture (6 g) of CuO, NiO, $Cu_{0.47}Ni_{0.53}O$ and $Ce_{0.8}Gd_{0.2}O_{1.9}$ (hereinafter CGO-20) was obtained and characterized as follows.

Figure 4:
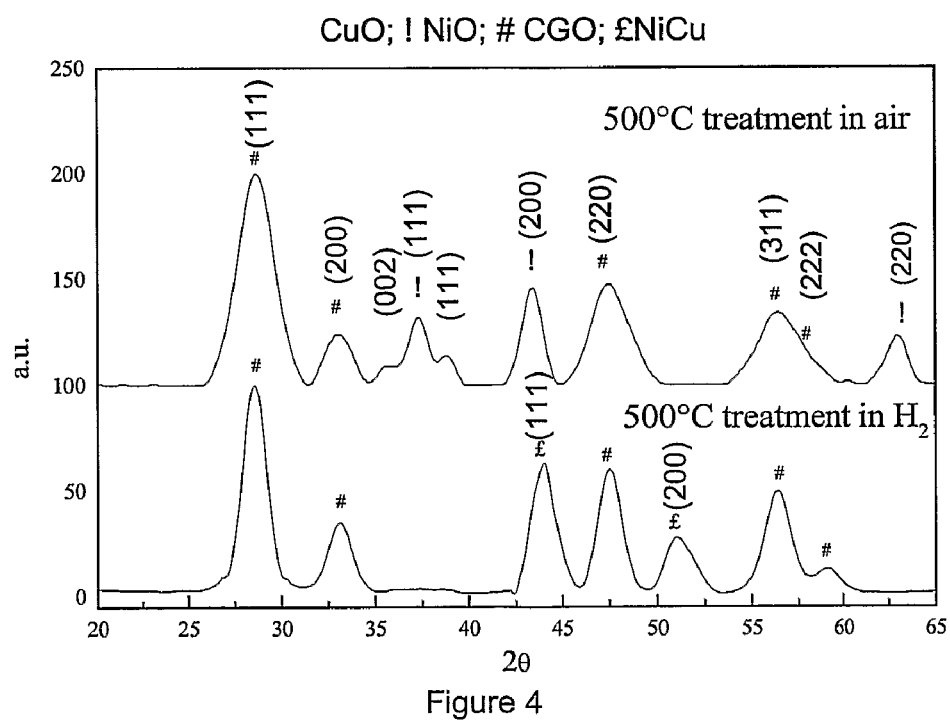

FIG. 4 shows the XRD analysis of the powder mixture. The mean primary grain size was calculated from the XRD patterns by use of the Debye-Scherrer formula (A. R. West "Solid State Chemistry and its application" Ed. John Wiley & Sons, 1996, page 174) giving values of 10 nm for NiO (together with the isostructural phase (Ni,Cu)O), 12 nm for CuO and 5 nm for CGO-20. The TEM imaging was in agreement with the calculated mean primary grain size. Moreover, it is not possible to distinguish all phases by shape due to their intimate mixing. The powders were weakly agglomerated as from SEM images.

The powder mixture was reduced at 500° C. for 2 h in $H_2$ (100%) to give the title cermet. According to the XRD pattern of FIG. 4 the resulting NiCu alloy pure phase has a mean primary grain size of 8 nm, and the CGO-20 has a mean primary grain size of 6 nm.

Example 4

$La_{0.60}Sr_{0.40}Fe_{0.80}Co_{0.20}O_{3-\delta}$ Nanopowder 1.0064 g $La(NO_3)_3.6H_2O$, 0.3278 g $Sr(NO_3)_2$, 1.2596 g $Fe(NO_3)_3.9H_2O$ and 0.2254 g $Co(NO_3)_2.6H_2O$ were added to 10 ml $H_2O$ while stirring and heating up to 50° C. The metal cation concentration of the solution was 0.776 mol/l $H_2O$.

The solution was added with 10 ml of 2-hydroxyethylmethacrylate and 5 ml polyethyleneglicoldiacrylate, then heated (80° C.). 20 drops of 35% $H_2O_2$ were added to initiate the gel formation.

The resulting gel was decomposed at 500° C. for 5 hours and at 700° C. for 5 hours. 1 g of the title compound were obtained and characterized as follows.

Figure 5:
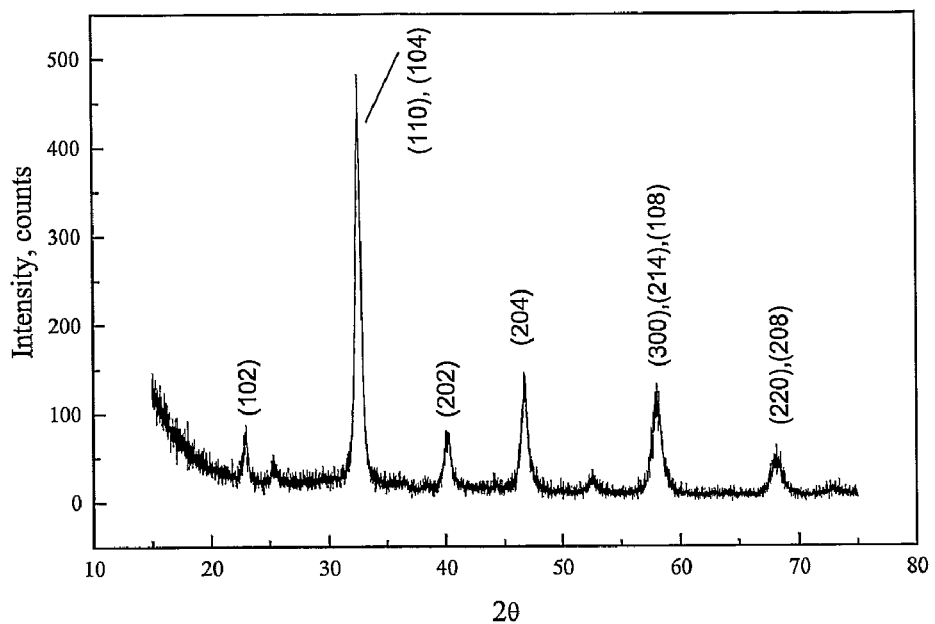

XRD of FIG. 5 showed that the sample contained a substantially single phase. The powder has a mean primary grain size of 10 nm calculated using the Debye-Scherrer formula (A. R. West "Solid State Chemistry and its application" Ed. John Wiley & Sons, 1996, page 174).

The material was obtained at a sintering temperature of 500° C. lower than that previously reported (see S. Wang, T. Kato, S. Nagata, T. Honda, T. Kaneko, N. Iwashita, M. Dokiya, Solid State Ionics, 146(2002) 203-210).

Example 5

$SrFeCo_{0.50}O_{3+\delta}$ Powder 0.9589 of g $Sr(NO_3)_2$, 1.8290 g of $Fe(NO_3)_3.9H_2O$ and 0.6588 of g $Co(NO_3)_2.6H_2O$ were added to 10 ml $H_2O$ while stirring and heating up to 40-50° C. The metal cation concentration was of 1.132 mol/l. Subsequently, 10 ml of 2-hydroxyethylmethacrylate and 5 ml polyethyleneglicoldiacrylate were added. The solution was heated (80° C.). 20 drops of 35 vol % $H_2O_2$ were added to initiate the gel formation.

The resulting gel was decomposed at 500° C. for 4 hours and then at 1000° C. for 6 hours. 1 g of the title compound was obtained and characterized as follows.

Figure 6:
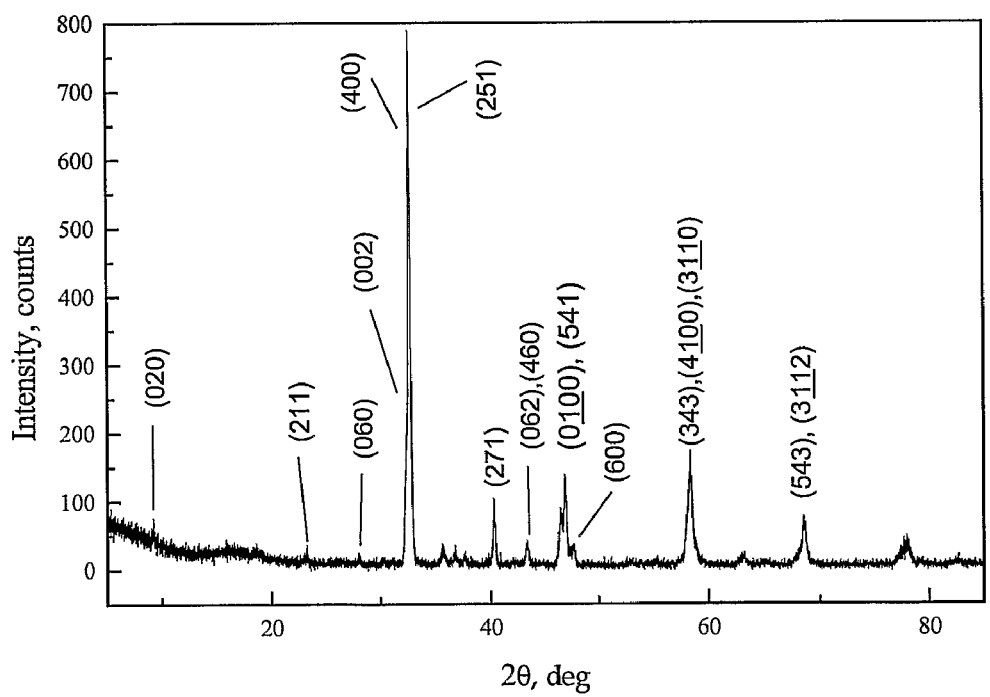

The XRD pattern of FIG. 6 shows that the sample is almost monophasic. It should be noted that we obtained the same material quality at 100-200° C. lower than it was reported before [R. Bredesen and T. Norby, Solid State Ionics, 129 (2000) 285].

The invention claimed is:

1. A process for manufacturing an electrochemical device comprising:
    providing a cathode, an anode, and at least one electrolyte membrane disposed between said anode and said cathode,
    wherein each of said cathode, anode, and the electrolyte membrane comprises at least one ceramic material, and
    wherein the process of providing at least one of the cathode, the anode, and the electrolyte membrane includes:
        thermally treating an aqueous solution comprising at least one metal cation, at least one hydrosoluble ethylenically unsaturated monomer with an ester moiety, and a hydrosoluble cross-linking monomer with at least two ethylenically unsaturated ester moieties to obtain a gel;
        calcining said gel to remove organic substances and to form at least one crystalline metal oxide in a nanosize powder; and
        sintering said powder to provide the ceramic material.

2. The process according to claim 1, wherein the electrochemical device is a solid oxide fuel cell.

3. The process according to claim 1, wherein the method of thermally treating, calcining, and sintering is used to form the anode that contains a ceramic material selected from:

cerium oxide, manganese oxide, molybdenum oxide, titania, ceria doped with gadolinia or samaria, niobia-doped ceria, perovskites, and cermet materials that comprise a metallic portion selected from copper, aluminum, gold, praseodymium, ytterbium, cerium, nickel, iron, cobalt, molybdenum, platinum, iridium, ruthenium, rhodium, silver, and palladium, and a ceramic portion selected from yttria-stabilized zirconia; ceria doped with gadolinia or samaria, and $La_{1-x}Sr_xGa_{1-y}Mg_yO_{3-\delta}$ wherein x and y are 0 to 0.7, and $\delta$ is from stoichiometry.

4. The process according to claim 1, wherein the method of thermally treating, calcining, and sintering is used to form the electrolyte membrane that contains a ceramic material selected from yttria-stabilized zirconia, ceria doped with gadolinia or samaria, and $La_{1-x}Sr_xGa_{1-y}Mg_yO_{3-\delta}$ wherein x and y are 0 to 0.7, and $\delta$ is from stoichiometry.

5. The process according to claim 1, wherein the method of thermally treating, calcining, and sintering is used to form the cathode that contains a material selected from oxides of rare earth elements, peroviskites, optionally in combination with a doped ceria, and mixtures thereof.

6. The process according to claim 1, wherein the aqueous solution comprises water or water with at least one hydrosoluble solvent.

7. The process according to claim 6, wherein the hydrosoluble solvent is selected from an alcohol, glycol, tetrahydrofuran, and dioxane.

8. The process according to claim 1, wherein the at least one metal cation is selected from lanthanum, strontium, chromium, zirconium, yttrium, aluminium, lithium, antimony, boron, cadmium, cerium, cobalt, copper, dysprosium, erbium, europium, gallium, gold, hafnium, holmium, iridium, iron, lutetium, manganese, molybdenum, nickel, niobium, osmium, palladium, platinum, praseodymium, rhenium, rhodium, rubidium, ruthenium, samarium, scandium, silver, sodium, tantalum, terbium, thorium, thulium, tin, titanium, tungsten, uranium, vanadium, and ytterbium cations.

9. The process according to claim 1, wherein the at least one metal cation solution is obtained by dissolving a hydrosoluble precursor selected from oxides, chlorides, carbonates, β-diketonates, hydroxides, nitrates, acetates, oxalates, and mixtures thereof.

10. The process according to claim 1, wherein the aqueous solution has a metal cation concentration higher than 0.5 mol/l.

11. The process according to claim 10, wherein the aqueous solution has a metal cation concentration of 1 to 10 mol/l.

12. The process according to claim 1, wherein the hydrosoluble ethylenically unsaturated monomer has general formula (I)

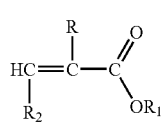
(I)

wherein R is hydrogen, $(C_1\text{-}C_4)$ alkyl, aryl, or aryl $(C_1\text{-}C_4)$ alkyl; $R_1$ is a $C_1\text{-}C_8$ hydrocarbon group containing at least one polar group selected from —COOH, —NH$_2$, —NHR', —N(R')$_2$, —OH, —OR', —SO$_3$H, or —SH, wherein R' is a $(C_1\text{-}C_6)$ alkyl group; and $R_2$ is hydrogen, methyl, ethyl, propyl, or phenyl.

13. The process according to claim 12, wherein R' is a $(C_1\text{-}C_4)$ alkyl group.

14. The process according to claim 12, wherein the hydrosoluble ethylenically unsaturated monomer is selected from 2-hydroxyethyl acrylate, 2-hydroxypropyl acrylate, 2-hydroxyethyl methacrylate, 2-hydroxypropyl methacrylate, 2-hydroxyethyl phenacrylate, hydroxybutyl acrylate, hydroxybutyl methacrylate, butandiol monoacrylate, 2-(2-ethoxyethoxy)ethyl acrylate, dimethylamino ethyl acrylate, and dimethylamino ethyl methacrylate.

15. The process according to claim 1, wherein the hydrosoluble cross-linking monomer is selected from diacrylates and triacrylates wherein acrylate groups are linked to alkoxylated moieties or polyoxyalkylene linear units.

16. The process according to claim 15, wherein the hydrosoluble cross-linking monomer is polyethyleneglycol diacrylate or ethoxylated trimethylolpropanetriacrylate.

17. The process according to claim 1, wherein the aqueous solution comprises a hydrosoluble polymerization initiator.

18. The process according to claim 17, wherein the hydrosoluble polymerization initiator is α,α'-azaisobutyronitrile (AIBN), tetramethylene-ethylenediamine, hydrogen peroxide, benzoyl peroxide, dicumyl peroxide, ammonium, sodium, or potassium persulfate.

19. The process according to claim 1, wherein the thermal treatment is effected at a temperature of about 50° C. to about 150° C.

20. The process according to claim 1, wherein before proceeding to the calcining step, the gel is dried to obtain a xerogel.

21. The process according to claim 20, wherein the gel is dried at a temperature of about 80° C. to about 300° C.

22. The process according to claim 20, wherein the xerogel is disaggregated and subjected to the calcining step.

23. The process according to claim 1, wherein the calcining step is carried out at a temperature of about 300° C. to about 1500° C.

24. The process according to claim 1, wherein the calcining step is carried out by progressively increasing temperature.

25. The process according to claim 1, wherein at least one grinding step of the powder is carried out at an intermediate stage of the calcining step.

26. The process according to claim 1, wherein the nanosize powder has a mean primary grain size lower than 20 nm.

27. The process according to claim 26, wherein the nanosize powder has a mean primary grain size of about 3 nm to about 15 nm.

28. The process according to claim 1, wherein a reduction step is effected together with the sintering step.

29. The process according to claim 28, wherein the reduction step is effected under hydrogen atmosphere.

30. The process according to claim 1, wherein the sintering of the nanosize powder is preceded by a shaping step to shape the nanosize powder into form of the anode, the cathode or the electrolyte membrane for the electrochemical device.

31. A process for manufacturing a nanosize oxide powder, the process comprising the steps of:

thermally treating an aqueous solution comprising at least one metal cation, at least one hydrosoluble ethylenically unsaturated monomer with an ester moiety, and a hydrosoluble cross-linking monomer with at least two ethylenically unsaturated ester moieties to obtain a gel; and calcining said gel to remove organic substances and to form at least one crystalline metal oxide in nanosize powder.

* * * * *